US006975996B2

(12) United States Patent
Lawrence et al.

(10) Patent No.: US 6,975,996 B2
(45) Date of Patent: Dec. 13, 2005

(54) ELECTRONIC SUBPOENA SERVICE (75) Inventors: David Lawrence, New York, NY (US); J. Gilmore Childers, Summit, NJ (US)

(73) Assignee: Goldman, Sachs & Co., New York, NY (US)

( * ) Notice: Subject to any disclaimer, the term of this patent is extended or adjusted under 35 U.S.C. 154(b) by 122 days.

(21) Appl. No.: 09/974,212

(22) Filed: Oct. 9, 2001

(65) Prior Publication Data

US 2003/0069742 A1 Apr. 10, 2003

(51) Int. Cl.⁷ .............................................. G06F 17/60
(52) U.S. Cl. ............................................. 705/1; 707/1
(58) Field of Search ........................ 705/1, 500; 707/1

(56) References Cited

U.S. PATENT DOCUMENTS

| | | | |
|---|---|---|---|
| 4,326,259 A | 4/1982 | Cooper et al. ............... 364/715 |
| 4,346,442 A | 8/1982 | Musmanno ................. 364/408 |
| 4,376,978 A | 3/1983 | Musmanno ................. 364/408 |
| 4,597,046 A | 6/1986 | Musmanno et al. ........ 364/408 |
| 4,718,009 A | 1/1988 | Cuervo ....................... 364/408 |
| 4,727,243 A | 2/1988 | Savar ......................... 235/379 |
| 4,734,564 A | 3/1988 | Boston et al. .............. 235/380 |
| 4,736,294 A | 4/1988 | Gill et al. ................... 364/408 |
| 4,774,663 A | 9/1988 | Musmanno et al. ........ 364/408 |
| 4,774,664 A | 9/1988 | Campbell et al. ........... 364/408 |
| 4,799,156 A | 1/1989 | Shavit et al. ............... 364/401 |
| 4,812,628 A | 3/1989 | Boston et al. .............. 235/380 |
| 4,868,866 A | 9/1989 | Williams, Jr. ................ 380/49 |
| 4,914,587 A | 4/1990 | Clouse ....................... 364/408 |
| 4,953,085 A | 8/1990 | Atkins ........................ 364/408 |
| 4,989,141 A | 1/1991 | Lyons et al. ................ 364/408 |
| 5,025,138 A | 6/1991 | Cuervo ....................... 235/379 |
| 5,038,284 A | 8/1991 | Kramer ...................... 364/408 |
| 5,068,888 A * | 11/1991 | Scherk et al. ............... 379/100 |
| 5,161,103 A | 11/1992 | Kosaka et al. .............. 364/408 |
| 5,177,342 A | 1/1993 | Adams |
| 5,210,687 A | 5/1993 | Wolfberg et al. ........... 364/408 |
| 5,239,462 A | 8/1993 | Jones et al. ................. 364/408 |
| 5,274,547 A | 12/1993 | Zoffel et al. ................ 364/408 |
| 5,323,315 A | 6/1994 | Highbloom ................. 364/408 |
| 5,347,632 A | 9/1994 | Filepp et al. ............... 395/200 |
| 5,398,300 A | 3/1995 | Levey ......................... 395/22 |
| 5,444,819 A | 8/1995 | Negishi ....................... 395/22 |
| 5,446,885 A | 8/1995 | Moore et al. ............... 395/600 |

(Continued)

FOREIGN PATENT DOCUMENTS

EP 1 137 209 A2 3/2001

(Continued)

OTHER PUBLICATIONS

Hicks M., "What, me spam?" Good intentions alone aren't enough to avoid alienating customers, eWeek Sep. 3, 2001, retrieved from DIALOG, DIALOG No.: 08984028, see abstract.

(Continued)

Primary Examiner—Edward Cosimano
(74) Attorney, Agent, or Firm—Buckley, Maschoff & Talwalkar LLC (57) ABSTRACT A method and system for delivering a subpoena via an electronic subpoena service. The electronic delivery can constitute legal service of the subpoena or be accompanied by hardcopy service. Utilization of a system to serve subpoenas can provide timely and efficient service with an automated audit trail. The system can enable broad service with confirmed identification of relevant parties to be served. An automated search of electronic records provides uniform search criteria for compliance, even with multiple locations and subsidiaries, including foreign subsidiaries. Ongoing searching via real time monitoring of accounts, credit, entities, wire transfer and other activities also provides a level of detail and uniformity heretofore unavailable.

20 Claims, 6 Drawing Sheets

U.S. PATENT DOCUMENTS

| | | | |
|---|---|---|---|
| 5,457,305 A | 10/1995 | Akel et al. | 235/379 |
| 5,557,518 A | 9/1996 | Rosen | 364/408 |
| 5,627,886 A | 5/1997 | Bowman | 379/111 |
| 5,649,116 A | 7/1997 | McCoy et al. | 395/238 |
| 5,679,938 A | 10/1997 | Templeton et al. | 235/379 |
| 5,679,940 A | 10/1997 | Templeton et al. | 235/380 |
| 5,696,907 A | 12/1997 | Tom | 395/238 |
| 5,704,045 A | 12/1997 | King et al. | 395/235 |
| 5,717,923 A | 2/1998 | Dedrick | 395/613 |
| 5,732,397 A | 3/1998 | DeTore et al. | 705/1 |
| 5,787,402 A | 7/1998 | Potter et al. | 705/37 |
| 5,790,639 A * | 8/1998 | Ranalli et al. | 379/100.08 |
| 5,797,133 A | 8/1998 | Jones et al. | 705/38 |
| 5,819,226 A | 10/1998 | Gopinathan et al. | 705/1 |
| 5,819,236 A | 10/1998 | Josephson | 705/35 |
| 5,852,812 A | 12/1998 | Reeder | 705/39 |
| 5,875,431 A | 2/1999 | Heckman et al. | 705/7 |
| 5,878,400 A | 3/1999 | Carter, III | 705/20 |
| 5,884,289 A | 3/1999 | Anderson et al. | 705/44 |
| 5,940,843 A * | 8/1999 | Zucknovich et al. | 707/516 |
| 5,959,577 A * | 9/1999 | Fan et al. | 342/357.13 |
| 5,963,923 A | 10/1999 | Garber | 705/37 |
| 5,991,743 A | 11/1999 | Irving et al. | 705/36 |
| 6,014,228 A * | 1/2000 | Castro | 358/400 |
| 6,016,963 A | 1/2000 | Ezawa et al. | 235/492 |
| 6,018,723 A | 1/2000 | Siegel et al. | 705/38 |
| 6,021,397 A | 2/2000 | Jones et al. | 705/36 |
| 6,078,904 A | 6/2000 | Rebane | |
| 6,078,905 A | 6/2000 | Pich-LeWinter | 705/36 |
| 6,085,175 A | 7/2000 | Gugel et al. | |
| 6,088,686 A | 7/2000 | Walker et al. | 705/38 |
| 6,119,103 A | 9/2000 | Basch et al. | |
| 6,148,301 A * | 11/2000 | Rosenthal | 707/10 |
| 6,199,073 B1 * | 3/2001 | Peairs et al. | 707/204 |
| 6,205,433 B1 | 3/2001 | Boesch et al. | 705/26 |
| 6,219,805 B1 | 4/2001 | Jones et al. | 714/38 |
| 6,236,972 B1 | 5/2001 | Shkedy | 705/1 |
| 6,246,996 B1 | 6/2001 | Stein et al. | 705/26 |
| 6,249,770 B1 | 6/2001 | Erwin et al. | 705/10 |
| 6,278,983 B1 | 8/2001 | Ball | 705/39 |
| 6,289,320 B1 | 9/2001 | Drummond et al. | 705/35 |
| 6,304,973 B1 | 10/2001 | Williams | 7013/201 |
| 6,311,272 B1 | 10/2001 | Gressel | 713/186 |
| 6,317,727 B1 | 11/2001 | May | 705/37 |
| 6,321,212 B1 | 11/2001 | Lange | 705/37 |
| 6,330,546 B1 | 12/2001 | Gopinathan et al. | 705/35 |
| 6,341,267 B1 | 1/2002 | Taub | 705/11 |
| 6,347,307 B1 | 2/2002 | Sandhu et al. | 705/35 |
| 6,393,423 B1 | 5/2002 | Goedken | 707/10 |
| 6,456,984 B1 | 9/2002 | Demoff et al. | 705/40 |
| 2001/0011243 A1 | 8/2001 | Dembo et al. | 705/36 |
| 2001/0027388 A1 | 10/2001 | Beverina et al. | 703/22 |
| 2001/0027389 A1 | 10/2001 | Beverina et al. | 703/22 |
| 2001/0047279 A1 | 11/2001 | Gargone | 705/1 |
| 2001/0049651 A1 | 12/2001 | Selleck | 705/37 |
| 2001/0054020 A1 | 12/2001 | Barth et al. | 705/37 |
| 2002/0016854 A1 | 2/2002 | Hirasawa et al. | 709/236 |
| 2002/0019804 A1 | 2/2002 | Sutton | 705/38 |
| 2002/0032635 A1 | 3/2002 | Harris et al. | 705/37 |
| 2002/0032646 A1 | 3/2002 | Sweeney et al. | 705/38 |
| 2002/0046053 A1 | 4/2002 | Hare et al. | 705/1 |
| 2002/0091635 A1 | 7/2002 | Dilip et al. | 705/39 |
| 2002/0091706 A1 | 7/2002 | Anderson et al. | 707/104.1 |
| 2002/0099640 A1 | 7/2002 | Lange | 705/37 |
| 2002/0103747 A1 | 8/2002 | Lawrence | 705/38 |
| 2002/0111890 A1 | 8/2002 | Sloan et al. | 705/36 |
| 2002/0138371 A1 | 9/2002 | Lawrence et al. | 705/27 |
| 2002/0138407 A1 | 9/2002 | Lawrence et al. | 705/38 |
| 2002/0138408 A1 | 9/2002 | Lawrence | 705/38 |
| 2002/0138417 A1 | 9/2002 | Lawrence | 705/38 |
| 2002/0139837 A1 | 10/2002 | Spitz et al. | 235/375 |
| 2002/0143562 A1 | 10/2002 | Lawrence | 705/1 |
| 2003/0069742 A1 | 4/2003 | Lawrence | 705/1 |
| 2003/0069821 A1 | 4/2003 | Williams | 705/36 |
| 2003/0069894 A1 | 4/2003 | Cotter et al. | 707/104.1 |
| 2003/0074272 A1 | 4/2003 | Knegendorf | 705/26 |
| 2003/0074310 A1 | 4/2003 | Grovit et al. | 705/39 |
| 2003/0140102 A1 * | 7/2003 | Takeuchi et al. | 709/206 |

FOREIGN PATENT DOCUMENTS

| | | | |
|---|---|---|---|
| EP | 1 143 365 A2 | 4/2001 | |
| JP | 02000020618 A | 6/1998 | |
| JP | 0200350896 A | 8/2001 | |
| WO | WO 00/17799 A1 | 9/2000 | |
| WO | WO 00/75836 A2 | 12/2000 | |
| WO | WO 01/55885 A2 | 8/2001 | |
| WO | WO 03/032112 A2 * | 4/2003 | |

OTHER PUBLICATIONS

Int'l Search Report dated May 15, 2003 for PCT/US02/31644.

Banasiak, Michael "Don't Be Out-Scored by Your Competition", *Credit and Financial Management Review*, 2nd Quarter 2000, 8pp., download from paynetonline.com/viewpaf.asp on Apr. 15, 2002. ©2000 Predictive Business Decision Systems, Inc.

Int'l Preliminary Examination Report dated Jul. 23, 2004 for corresponding PCT application, PCT/US02/31644.

World-Check Search—Vladimir Gusinsky (Russia).

"Transforming Discovery Into Opportunity"; "Key Personnel Bios"; "Frequently Asked Questions"; *Mantas*. Mantas, Inc., Announces Funding and Management Team:, *Mantas*, Jun. 4, 2001. "Safeguard and SRA Partner to Launch Mantas, Inc.", *Mantas*,. "Knowledge Discovery Platform"; "Money Laundering Detection for Banks"; "Fraud and Money Laundering Detection for Securities Firms"; "Best Execution"; "Equities Trading Compliance", *Mantas*.

Power, Stephen "Background Checks Await Fliers." *The Wall Street Journal*, Jun. 7, 2002.

Purcell, Lea "Roping in Risk." *Factiva*, May 1, 1994.

McLure, Leslie "Taking the Risk Out of Transactions." *Factiva*, Mar. 1, 1994.

Healy, Thomas J. "The New Science of Borrower Behavior." *Factiva*, Feb. 1, 1998.

Quinn, Jane Bryant "Credit Card Issuers; Keeping a Closer Watch on How You Pay Bills." *The Washington Post*, Apr. 25, 1988.

Gullo, Karen "Neutral Nets Versus Card Fraud; Chase's Software Learns to Detect Potential Crime." T*The American Banker*, Feb. 2, 1990.

Grafton, David. "Analysing Customers With Behavioural Modelling." *Credit Control*, Vol. 17, 1996, pp. 27-31.

Aguais, Scott D. "It's the Economy." *Credit Card Management*, vol. 5, 1993, pp. 58-60.

"Five Ways to Reduce Risk with Neutral Networks." *Credit Risk Management Report*, vol. 3, Jun. 27, 1993.

Leonard, Kevin J. and William J. Banks. "Automating the Credit Decision Process." *Journal of Retail Banking*, vol. 16, 1994, p. 39.

Higgins, Kevin T. "Retention by the Numbers." *Credit Card Management*, vol. 5, 1993, pp. 52-56.

Caudill, Maureen et al., "Naturally Intelligent Systems." *The MIT Press*, 1990.

"Enterprise Anti-Money Laundering Product Specification." *Mantas*, 2001.

Everest-Hill, Deborah et al., "Automating Risk Assessment." *The Internal Auditor*, vol. 56, Jun. 1999, pp. 23-25.

Chandler, Gary "Credit Scoring; A Feasibility Study." *Executive*, 1985.

Banasiak, Michael, "Don't be Out-Scored by Your Competition", *Credit and Financial Management Review*, $2^{nd}$ Quarter 2000.

Barrett, Jennifer, "Banking on Software Solutions", *Newsweek Web*, Jun. 12, 2002.

* cited by examiner

ELECTRONIC SUBPOENA SERVICE

BACKGROUND

This invention relates generally to a method and system for effecting legal service of a subpoena for information held by a financial or non-financial institution. In particular, the present invention relates to a computerized system and method for banks and non-bank financial institutions to accept service of a subpoena, automatically search their records for any information related to the subject of the subpoena, and generate a response in a timely manner, thereby expediting law enforcement efforts.

A government agency on the trail of money needs to have access to information contained in the records of banks and other financial institutions. Currently, the government is limited because there is no vehicle that allows the government to effect widespread service of a subpoena which relates to a person or entity which it needs to investigate. Fax subpoenas can be utilized, but fax delivery only affects one small aspect of the subpoena process, which is the delivery of a hardcopy. The logistical problems associated with who to fax a document to, whether the intended recipient is available, and whether the fax is received, also must be addressed.

Another shortcoming with the present system is the lack of coordination amongst agencies conducting investigations which results in inconsistent and non-unified lists of suspect names. One agency may very well not know that another agency is already conducting research into a particular name or to what extent another agency may have collected information regarding a particular name.

In another aspect, a bank's lawyers and other financial institution personnel typically have few resources available to assist them with the identification of information associated with a particular subpoena. A substantial amount of information needs to be considered in order to properly comply with a subpoena and to evaluate whether particular information should be provided under the terms of the subpoena. Search criteria and matching are largely subjective and can vary from institution to institution depending upon the skill set and degree of commitment. As a result, based largely upon who conducts a search to comply with a subpoena, one institution may conduct a thorough search of their records and provide results that include a search for alternate spelling of names, aliases, associations or other useful information, while another institution may provide a bare minimum of information.

Financial institutions do not have available a mechanism which can provide automated real time assistance to receive a subpoena and search their electronic records in a thorough and consistent manner for information associated with an international entity or subject of a subpoena. In the event of inexact matches to requested information, it is often a difficult and subjective task to manually review records and ascertain which information should be included in a response to the subpoena. Absent a means with which to timely receive a subpoena and search their records for any information related to the subpoenaed information, a financial institution may delay law enforcement efforts.

What is needed is a method and system to accept an electronic subpoena and process the subpoena in an automated and expeditious manner. A new method and system should anticipate offering guidance to personnel who process the subpoena and providing search algorithms and methods which allow the personnel to locate as much pertinent information as is feasible. In addition, the system should allow for an electronic transmission of information responsive to the subpoena, and help the personnel identify high risk situations.

SUMMARY

Accordingly, a method and system is provided for delivering a subpoena via an electronic subpoena service (ESS system). The electronic delivery can constitute legal service of the subpoena or be accompanied by hardcopy service. Utilization of an ESS system to serve subpoenas can provide timely and efficient service with an automated audit trail. The ESS system can enable broad service with confirmed identification of relevant parties to be served. An automated search of electronic records provides uniform search criteria for compliance, even with multiple locations and subsidiaries, including foreign subsidiaries. Ongoing searching via real time monitoring of accounts, credit, entities, wire transfer and other activities also provides a level of detail and uniformity heretofore unavailable.

The invention includes a computer-implemented method for delivering a subpoena over a distributed network by storing information comprising a subpoena on a computerized server and transmitting the information comprising the subpoena from the server to a designated computerized device; and receiving data responsive to a request contained within the subpoena. In addition the invention can include receiving an acknowledgement from the computerized device that the information comprising the subpoena had been received; and storing the data received wherein it can be combined with additional stored the data. Reports descriptive of the subject of the subpoena can also be generated. Additional data relating to the subpoena from a second computerized server can also be transmitted and received. In implementing the present invention, one or more computerized servers can act responsive to instructions received from different government agencies.

A search algorithm and executable search software can also be transmitted to a designated computerized device. Data received responsive to a subpoena request can be processed to create new informational requests subject to and included in the subpoena, wherein the new information can also be transmitted from the server to a designated computerized device.

In another aspect the present invention includes a computer-implemented method for processing an electronic subpoena that includes receiving information comprising a subpoena on a computerized device and searching stored computer records for data relating to a request contained within the subpoena. Data related to a request contained within the subpoena can be transmitted to a designated aggregation device, such as an ESS server.

A search algorithm related to the request contained within the subpoena can also be received electronically, as can an executable search software program. The software can include code and routines for monitoring transactions on in-house computers and gathering data related to the transactions which also relates to the request contained within the subpoena. The gathered data can be transmitted to the designated aggregation device.

An updated request subject to the subpoena can also be electronically received which can cause additional searching of stored computer records for data relating to the updated request comprising the subpoena and transmitting data relating to the updated request to a designated aggregation device.

Still another aspect can include delivering a subpoena by storing information comprising a subpoena on a computerized server and delivering a hardcopy of the subpoena to the subpoenaed party with a subpoena identifier associated with the hardcopy of the subpoena, wherein the subpoena identifier uniquely identifies the subpoena. Information included in the subpoena and the subpoena identifier can then be transmitted from the server to a designated computerized device. Data responsive to a request contained within the subpoena can be received.

Similarly, a subpoena can be accepted and processed by receiving a hardcopy of a subpoena including a subpoena identifier and also receiving electronic information comprising a subpoena and a subpoena identifier with a computerized device. The subpoena identifier can be utilized to confirm that a subpoena received electronically corresponds with the hardcopy subpoena.

Other implementations include a computerized system for delivering a subpoena, the system including a computer server capable of communicating via a communications network and executable software stored on the server and executable on demand. The software operative with the server to cause the system to perform the methods of the present invention.

Still other embodiments include computer executable program code residing on a computer-readable medium, a computer data signal embodied in a digital data stream, or a method of interacting with a designated computerized device. Various features and embodiments are further described in the following figures, drawings and claims.

DETAILED DESCRIPTION

The present invention includes a computerized method and system for delivering a subpoena via an ESS system. The electronic delivery can constitute legal service of the subpoena or be accompanied by hardcopy service. A computerized system stores information including an electronic version of a subpoena in a database or other data storing structure and transmits the information to a subpoenaed party. The party can be associated with a designated computing device to which the information can be transmitted. Data responsive to a request in the subpoena can be received by the computerized system.

Utilization of an ESS system to serve subpoenas can provide timely and efficient service with an automated audit trail. The ESS system enables broad service with confirmed identification of relevant parties to be served. An automated search of electronic records provides uniform search criteria for compliance, even with multiple locations and subsidiaries, including foreign subsidiaries. Ongoing searching via real time monitoring of accounts, credit, entities, wire transfer and other activities also provides a level of detail and uniformity heretofore unavailable. Automated searching can facilitate use of an algorithm which will capture match variations that may be responsive for regulatory reporting.

Figure 1:
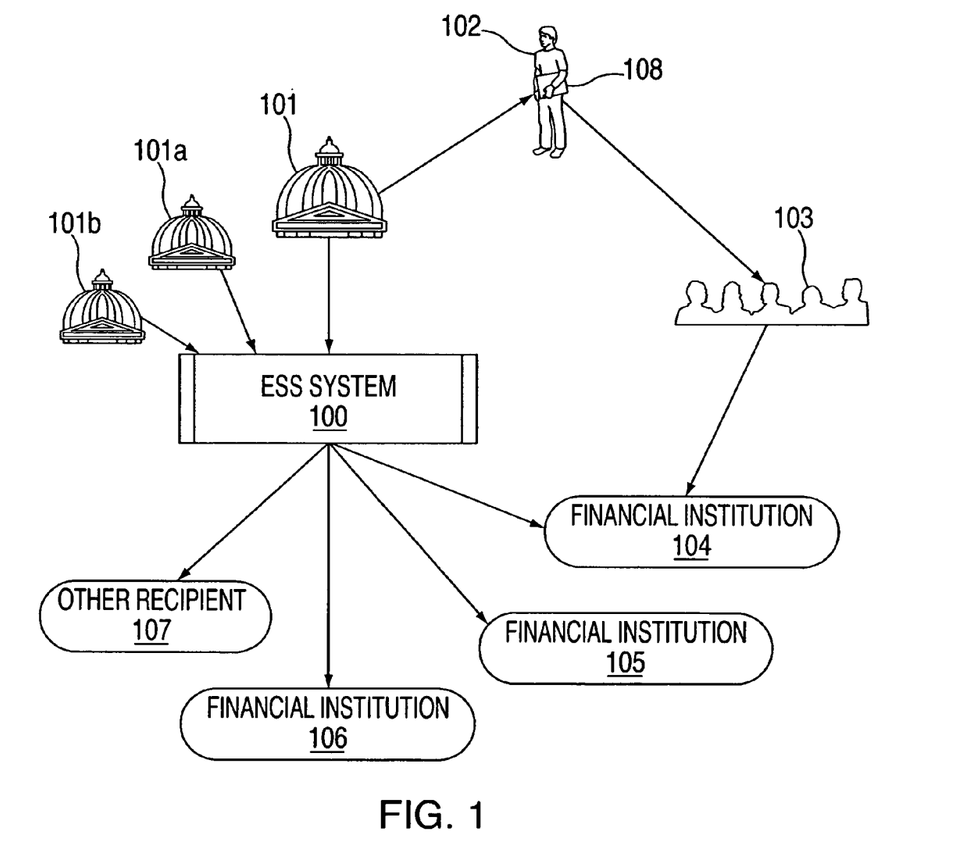
FIG. 1 illustrates a block diagram which can embody this invention.

Referring now to FIG. 1 a block diagram of one embodiment of the present invention is illustrated. An ESS system 100 receives information relating to one or more subpoenas which are to be served upon entities, such as for example, a financial institution. The information includes an electronic version of the subpoena, or in one embodiment, sufficient information for the ESS system to compose an electronic subpoena. The subpoena can be received from an issuer of the subpoena 101, for example a government agency such as, the Department of Justice (DOJ), US Attorneys, Federal Bureau of Investigation (FBI), State Prosecutors, District Attorneys, State Police, Treasury, Office of Foreign Access Control (OFAC), Secret Service, Customs, Drug Enforcement Agency (DEA), or other government agency.

Preferably the subpoena will be storable in a standard format that can be readily accessible to recipients. For example the subpoena may be received or transmitted in Portable Document Format (PDF) or Rich Text Format (RTF).

The subpoena issuer 101 will input into the ESS system 100 the content of a subpoena and a list of subpoenaed entities which must be served the subpoena. In one embodiment, the ESS system 100 will maintain a database of contact information relating to subpoenaed entities. In another embodiment, the subpoena issuer 101 will supply contact information with each new subpoena. In either case, the ESS system will distribute the electronic subpoena in order to effect service. Typically, subpoenaed entities 104–107 will include financial institutions 104–106, although other types of entities 107 can also receive electronic service of subpoenas.

An institution that may implement, or make use of the present invention can include an investment bank, a merchant bank, a commercial bank, a security firm, an asset management company, a hedge fund, a mutual fund, a credit rating agency, a security exchange and bourse, an institutional or individual investor, an auditing firm, a law firm, or other institution who may be involved with financial transactions. Similarly, financial transactions can include investment and merchant banking, public or private financing, commodities and securities trading, commercial and consumer lending, asset management, rating of corporations and securities, public and private equity investment, public and private fixed income investment, or other business related transactions.

Service is accomplished by the subpoenaed entity 104–107 receiving the subpoena through an electronic communication. The electronic communication can include a push technology wherein the subpoena is transmitted to the subpoenaed entity 104–107 independent of any action on the part of the subpoenaed entity 104–107, or through pull technology, wherein the subpoenaed party will make an affirmative action to receive the subpoena, such as by retrieving the subpoena from a server on a distributed network.

In one embodiment, an affirmative action can be made by the subpoenaed entity 104–107 which will act as a confirmation that the subpoena has been received by the subpoenaed entity 104–107. An affirmative action can include, for example, an electronic message sent by the subpoenaed entity 104–107, or activation of a programmable device, such as a graphical user interface (GUI) button, check box or other device.

In another embodiment, a subpoena issuer 101 can employ a process server 102 to accomplish physical service of a hardcopy subpoena 108 upon a representative 103 of the subpoenaed entity 104. The hardcopy subpoena 108 can be accompanied by a unique subpoena identifier, such as an alpha-numeric code or document number. The subpoenaed entity 104 can then access the ESS system 100 and accept delivery of an electronic subpoena corresponding with the hardcopy subpoena 108 which has been received. The electronic subpoena can include searching algorithms or other enhancements not available with the hardcopy 108, while the hardcopy 108 can satisfy those who prefer to have traditional documents on file.

Enhancements which can be included with an electronic subpoena can include search software and search algorithms. Distribution of search software to subpoenaed entities 104–107 can create uniformity of searching efforts across the subpoenaed entities 104–107. The searching software can include executable code that is run on the computers of a subpoenaed entity 104–107. The software can search for exact matches as well as variations of spellings, aliases, also known as (aka) references, or other type of fuzzy searches. Those schooled in the art will recognize that many well known programmable searching methodologies can be utilized in this capacity.

Searching algorithms can also be delivered with an electronic subpoena. The algorithm can be utilized in conjunction with distributed search software or in conjunction with in-house search software used by the subpoenaed entity 104–107.

Information that is discovered as a result of a subpoena can be electronically transmitted to the ESS system 100. If appropriate, the information received can facilitate the refinement of search criteria and/or algorithms. The refined search algorithms can be subsequently delivered to the subpoenaed entities 104–107. In addition, search algorithms can be utilized to continually monitor records and transactions in real time so that subsequent actions or information received can also be submitted to the subpoena issuer 101.

An ESS system 100 can also act as a clearinghouse for subpoenas, wherein various government agencies 101, 101a, 101b can coordinate with each other and also access an organized list of subpoenas. The organization of subpoenas and information received as a result of the subpoenas can relieve duplication of efforts by separate agencies or organizations 101, 101a, 101b and facilitate the sharing of information uncovered as a result of one investigation with another parallel investigation.

A preferred embodiment will include a hub and spoke type architecture with various government agencies 101, 101a, 101b submitting subpoenas to be served upon various financial or other institutions 104–107. The ESS system 100 coordinates the service of each subpoena and the receipt of information pursuant to each subpoena. In addition, the ESS system 100 can act to oversee and organize similar, duplicative or complimentary investigations as they are manifest in the subpoenas. Of particular importance may be the ability to coordinate the handling of non-public information so that it is accessible to the proper parties on a need to know basis, but still maintained with a proper level of confidentiality.

A log or other stored history can be created to track service of each subpoena and responses as rendered.

Figure 2:
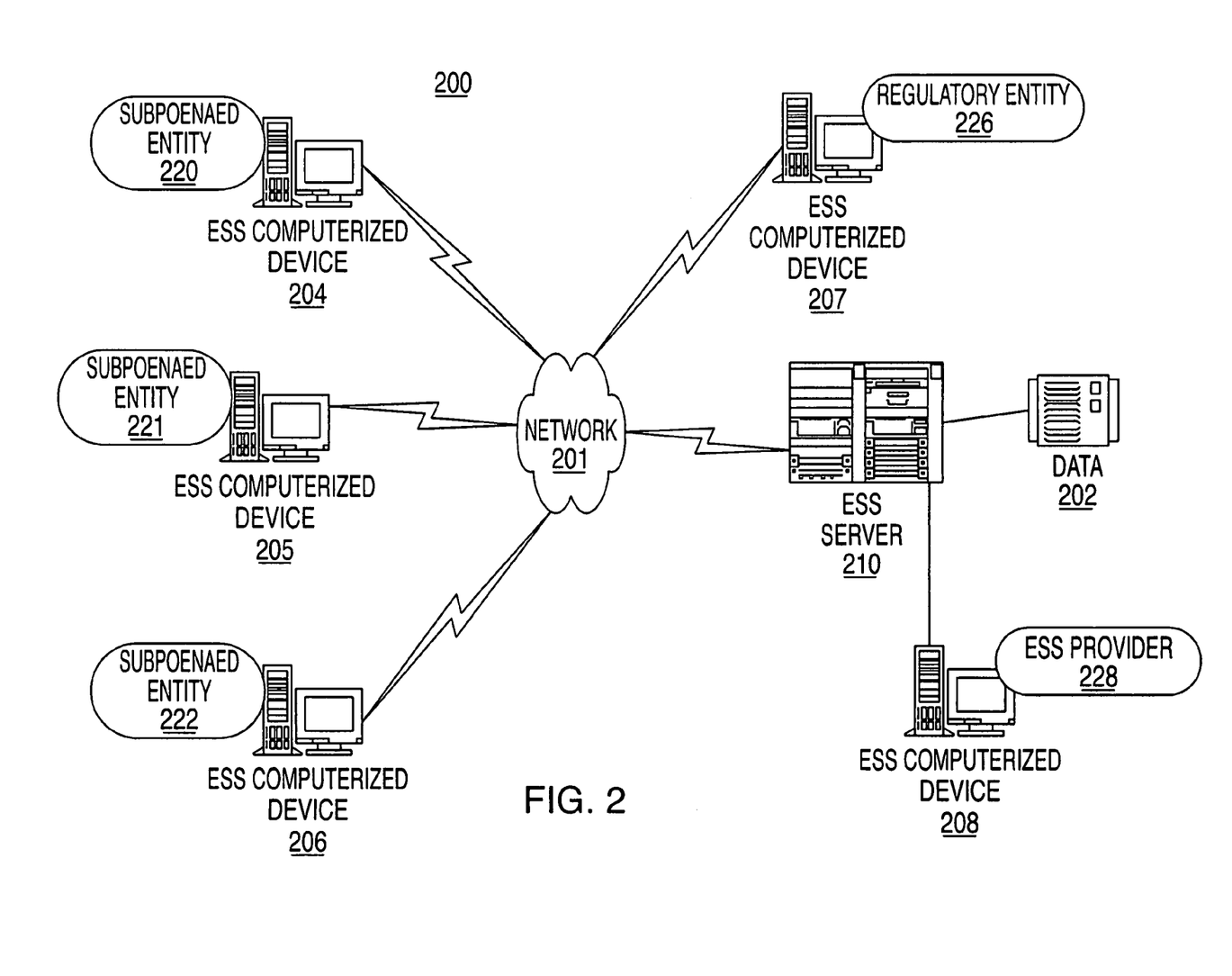
FIG. 2 illustrates a network on computer systems that can embody an electronic subpoena service system.

Referring now to FIG. 2, a network diagram illustrating one embodiment of the present invention is shown. An automated ESS system 200 can include a computerized ESS server 210 accessible via a distributed network 201 such as the Internet, or a private network. A Subpoenaed Entity 220–222 or other party interested in ESS risk management, can use a computerized system or designated computerized device 204–208 to receive, input, transmit or view information processed in the ESS server 210. A protocol, such as the transmission control protocol internet protocol (TCP/IP) can be utilized to provide consistency and reliability.

Each designated computerized device can include a processor, memory and a user input device, such as a keyboard and/or mouse, and a user output device, such as a display screen and/or printer. The designated computerized devices 204–208 can communicate with the ESS server 210 to access data stored at the ESS server 210. The designated computerized device 204–208 may interact with the ESS server 210 as if the ESS server 210 was a single entity in the network 201. However, the ESS server 210 may include multiple processing and database sub-systems, such as cooperative or redundant processing and/or database servers, that can be geographically dispersed throughout the network 201. In some implementations, groups of designated computerized devices 204–208 may communicate with ESS server 210 through a local area network.

The ESS server 210 includes one or more databases 202 storing data relating to ESS risk management. The ESS server 210 may interact with and/or gather data from a Subpoenaed Entity 220–222, or other entity who is operating a designated computerized device 204–208. Data gathered from an operator may be structured according to subpoenaed information and organized for future retrieval.

Typically a user will access the ESS server 210 using client software executed at a designated computerized device 204–208. The client software may include a generic hypertext markup language (HTML) browser, such as NETSCAPE NAVIGATOR or MICROSOFT INTERNET EXPLORER, (a "WEB browser"). The client software may also be a proprietary browser, and/or other host access software. In some cases, an executable program, such as a JAVA™ program, may be downloaded from the ESS server 210 to a designated computerized device 204–208 and executed at the designated computerized device 204–208 or other computer as part of the ESS system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

Figure 3:
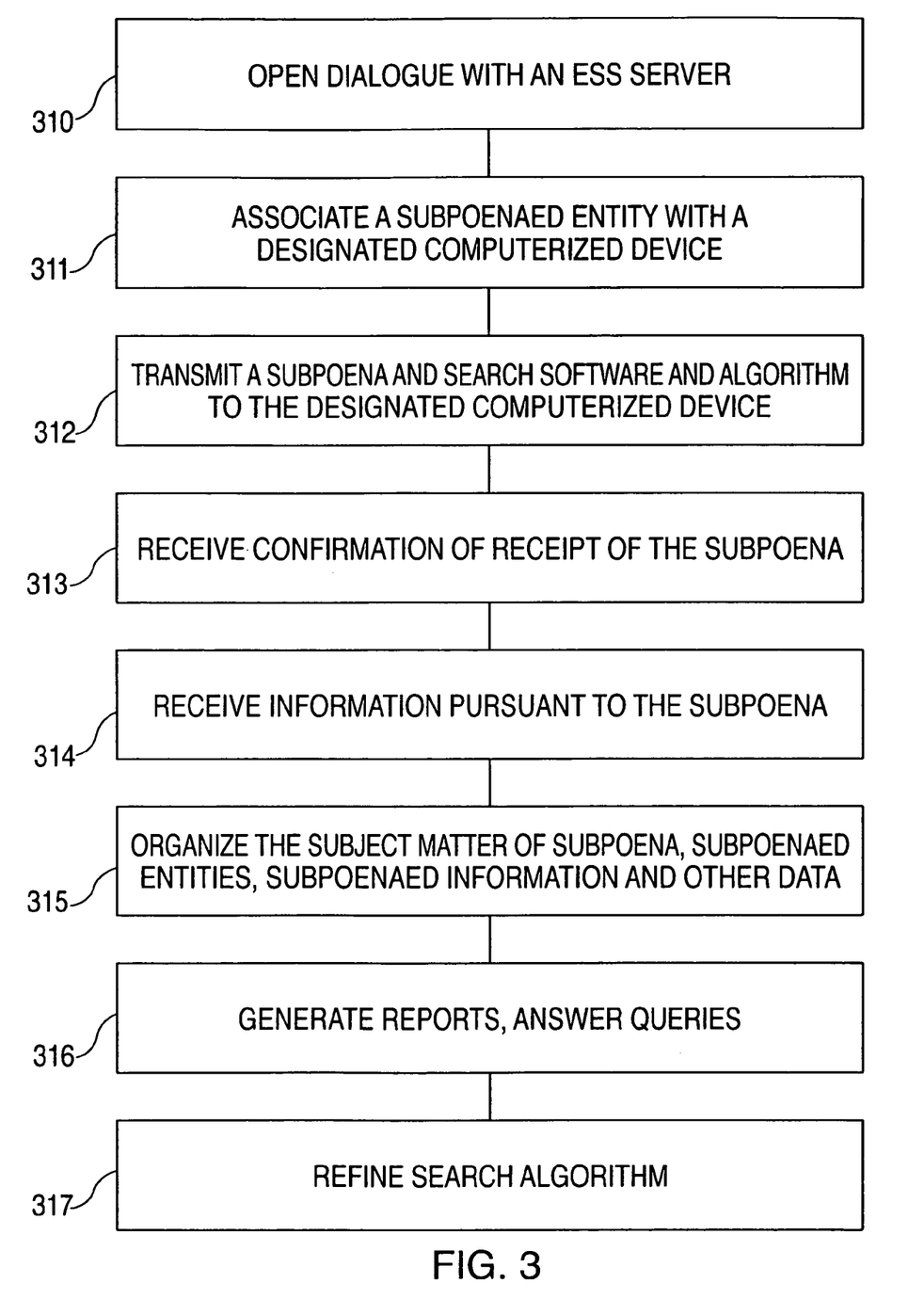
FIG. 3 illustrates a flow of exemplary steps that can be practiced by a provider of an ESS service.

Referring now to FIG. 3, electronic service of a subpoena can begin with opening a dialogue with an ESS server 310. Typically, the dialogue would be opened by presenting a GUI to a designated computerized device accessible by a person. The GUI will be capable of accepting data input via a designated computerized device. An example of a GUI would include an image of a subpoena and can also include search criteria or algorithms. A dialogue can include transmission and receipt of information. Information can be received directly into fields of a database or in free form.

Information can be transmitted and received on an ongoing basis such that if new events or information can further facilitate the gathering of subpoenaed information, an ESS search algorithm can be adjusted accordingly.

The ESS server can associate a subpoenaed entity 104–107 with a designated computerized device 311. A corresponding subpoena as well as search software and algorithm can be transmitted from the ESS server to the subpoenaed entity via the designated computerized device 312. The ESS server can also receive a confirmation of receipt of the subpoena from the subpoenaed entity 313.

Informational data can also be received into the ESS server pursuant to the subject of the subpoena 314. The ESS server can organize the subject matter of the subpoena, the subpoenaed entities, subpoenaed information and other data 315, and generate reports or answer queries as appropriate 316. In addition, a search algorithm can be modified according to search results, information received, or other input 317.

Figure 4:
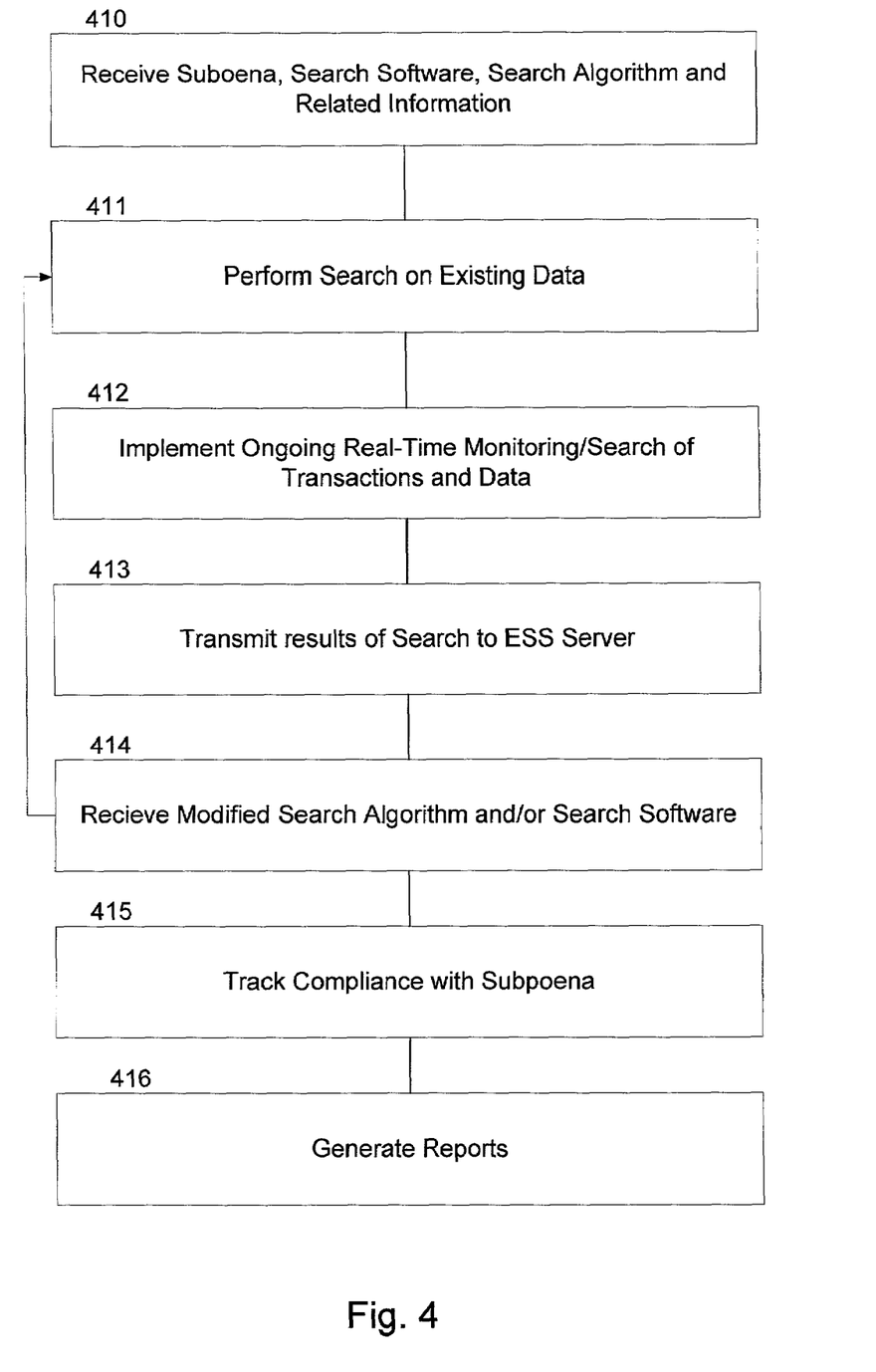
FIG. 4 illustrates a flow of exemplary steps that can be practiced by an institution accepting service via an ESS system.

Referring now to FIG. 4, an subpoenaed entity can receive an electronic subpoena as well as search software, search algorithm or other related data 410. A search can be performed on existing data 411 and an ongoing real-time monitor or search can also be implemented to constantly update the results of the subpoena for new transactions and data 412.

The results of a search responsive to the electronic subpoena can be transmitted to the ESS server 413 and a modified search algorithm and/or search software can be received 414. The process can loop back to continually perform the search of existing data, monitor new data in real-time and receive updated search algorithms until the expiration of a subpoena timeframe. Throughout the process, compliance with the subpoena can be tracked by the ESS server and/or the subpoenaed entity's computer systems 415. As a result either system can also generate reports indicating the extent of compliance 416.

Figure 4A:
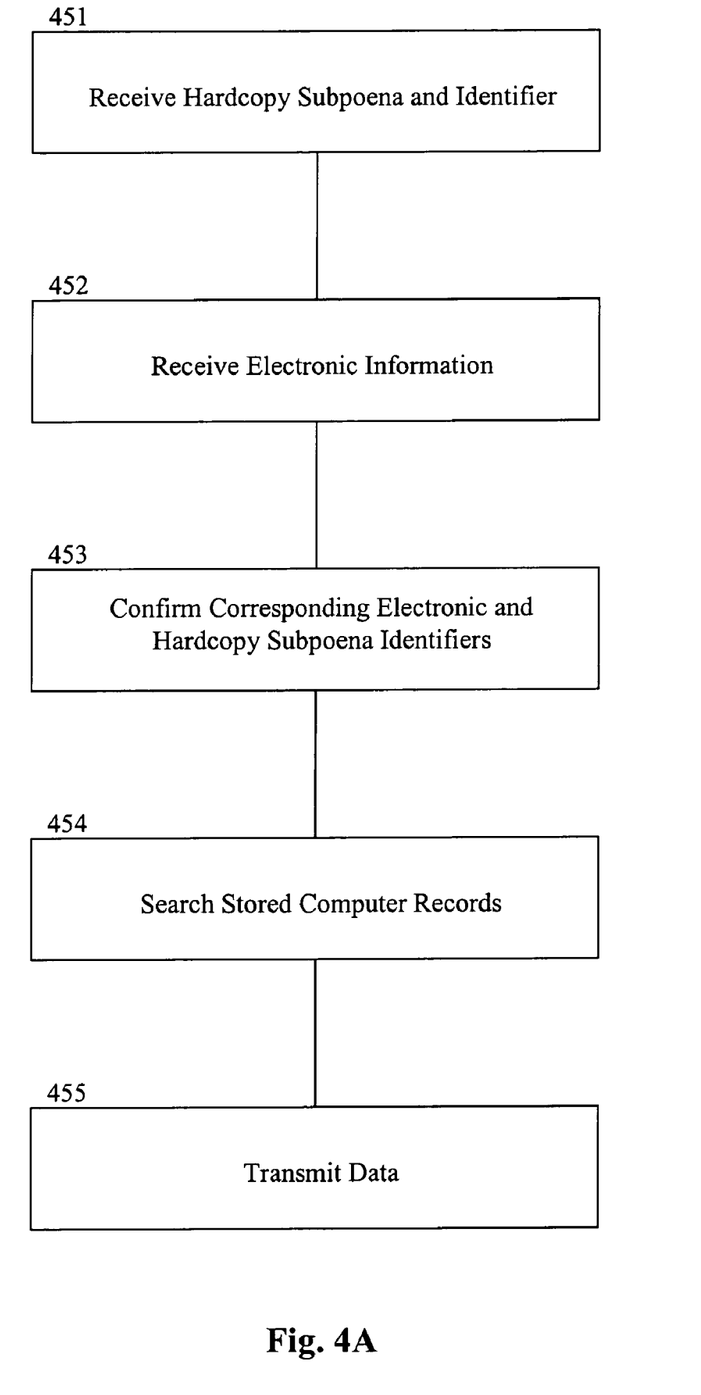
FIG. 4A illustrates a flow of exemplary steps that can be followed in order to process a hardcopy subpoena via an ESS system.

Referring now to FIG. 4A, a method is shown for processing a hardcopy subpoena. An entity can receive a hardcopy subpoena including a subpoena identifier 451. A computing device can receive electronic information comprising the subpoena and the subpoena identifier 452. It can be confirmed that the electronically received subpoena identifier corresponds with the hardcopy subpoena identifier 453. Stored computer records can be searched for data relating to the request contained within the subpoena 454, and that data can be transmitted to a designated computing aggregation device 455.

Figure 5:
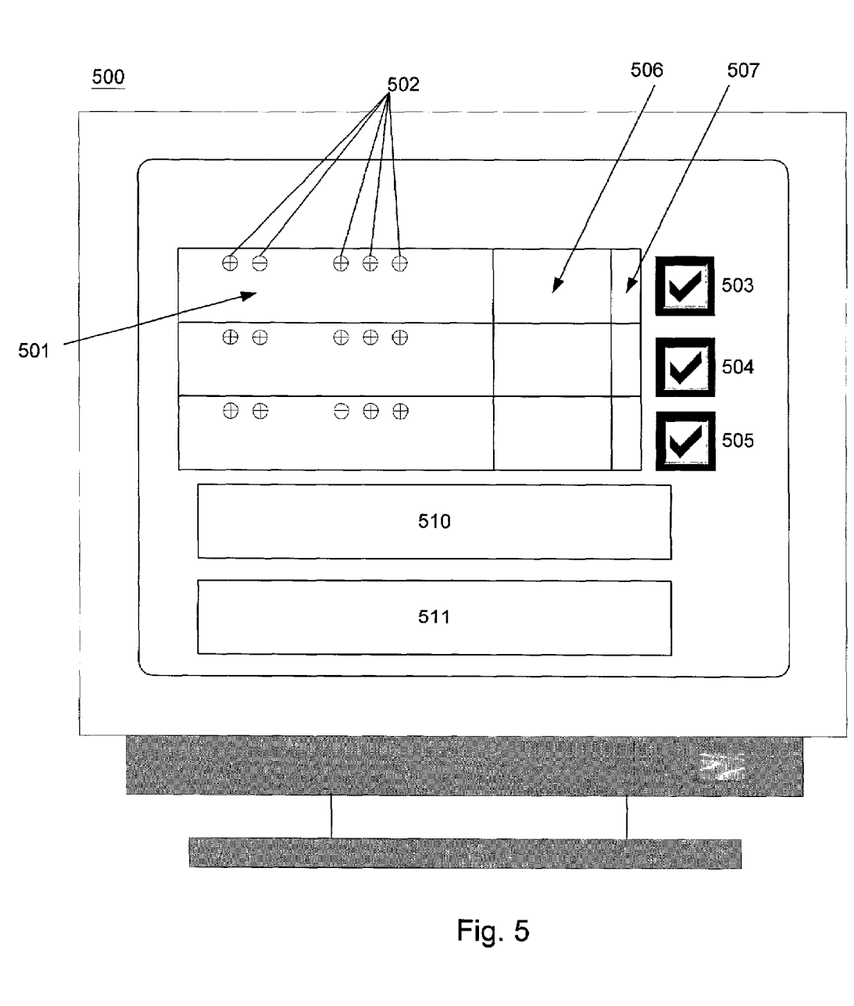
FIG. 5 illustrates an exemplary graphical user interface useful for interacting with an ESS system.

Referring now to FIG. 5, an exemplary GUI for receiving information related to ESS risk management is illustrated 500. The GUI can include areas prompting for information 501 such as in the form of a key word or a question 502. Areas can also be included for an appropriate response 506. The area for an appropriate response 506 can, for example, receive text, allow a selection from choices proffered, or otherwise receive data into the computerized ESS system 100. A programmable user interactive device, such as a checkbox, X field, yes/no field or other device can be utilized to indicate an answer, or otherwise input information 503–505. An image of a subpoena 510 can also be indicated on the GUI. The receiving information GUI 500 can also include areas for displaying information transmitted responsive to a subpoena 511.

A number of embodiments of the present invention have been described. Nevertheless, it will be understood that various modifications may be made without departing from the spirit and scope of the invention. For example, designated computerized devices 204–208 can comprise a personal computer executing an operating system such as MICROSOFT WINDOWS™, UNIX™, or APPLE MAC OS™, as well as software applications, such as a JAVA program or a web browser. Designated computerized devices 204–208 can also be a terminal device, a palm-type computer, mobile WEB access device, a TV WEB browser or other device that can adhere to a point-to-point or network communication protocol such as the Internet protocol. Computers and designated computerized devices 204–208 can include a processor, RAM and/or ROM memory, a display capability, an input device and hard disk or other relatively permanent storage. Accordingly, other embodiments are within the scope of the following claims.

What is claimed is:

1. A computer-implemented method for facilitating delivery of a subpoena, the method comprising:

receiving into a computer server, information from one or more governmental agencies comprising the subject matter of a subpoena, wherein the information comprises data providing a legal description of one or more legal persons to be served the subpoena;

storing the information comprising the subject matter of the subpoena on the computer server;

associating a unique subpoena identifier with the stored information comprising the subject matter of the subpoena;

designating a particular computing device for each of the persons to be served the subpoena, each of the respective computing devices in operative communication with the computer server via an electronic communications network;

transmitting the information comprising the subpoena and the unique subpoena identifier from the server to each of the designated computing devices associated with each of the one or more persons to be served the subpoena;

receiving data into the computer server from one or more of the computing devices associated with each of the one or more persons to be served the subpoena, wherein the data received into the computer server comprises an indication generated by an affirmative action by the person to be served the subpoena or a person acting on behalf of the person to be served the subpoena, acknowledging: receipt of the subpoena identified with the unique subpoena identifier; receipt of a hardcopy of the subpoena and data related to the subject matter of the subpoena;

tracking those designated computing devices from which data is received; and creating an indication of which persons have responded to the subpoena based upon the tracking of the designated computing devices and the unique subpoena identifier.

2. The method of claim 1 wherein the information comprising the subject matter of the subpoena is received from more than one different government agencies.

3. The method of claim 1 additionally comprising the steps of:

creating a second subpoena based upon the data received from one or more of the computing devices associated with each of the one or more persons to be served a first subpoena, and identified with the unique subpoena identifier for the first subpoena; and transmitting new information comprising the subject matter of the second subpoena from the computer server to one or more of the computing devices associated with each of one or more persons to be served the second subpoena.

4. The method of claim 1 additionally comprising the step of transmitting from the computer server a search algorithm to the computing device, wherein the search algorithm is based upon the subject matter of the subpoena.

5. The method of claim 4 additionally comprising the steps of:
   transmitting from the computer server executable search software to each of the computing devices, wherein the executable search software is operative with the search algorithm to search for data related to the subject matter of the subpoena; and
   tracking in the computer server data received into the computer server from two or more of the computing devices that results from executing the search software, wherein the data received from the two or more computing devices is identified with the unique subpoena identifier.

6. The method of claim 4 or 5 wherein the search algorithm comprises variations of subject matter contained in the subpoena transmitted to the computing device.

7. The method of claim 1 additionally comprising the step of receiving an acknowledgement into the computer server from the one or more of the designated computing devices that the information comprising the subject matter of the subpoena had been received by the one or more designated computing devices.

8. The method of claim 7 additionally comprising the steps of:
   storing the data received from the one or more designated computing devices in the computer server;
   combining in the computer server the data received from each of the respective designated computing devices;
   generating a report in the computer server descriptive of the subject matter of the subpoena and also comprising the data received from each of the respective designated computing devices;
   associating in the computer server the report with the unique subpoena identifier; and
   transmitting from the computer server the report and unique subpoena identifier to the one or more government agencies.

9. The method of claim 8 additionally comprising the steps of:
   receiving additional information comprising the subject matter of a second subpoena to be served to the same one or more persons to be served a first subpoena and associated with a second unique identifier; and
   combining the information comprising the subject matter of the first subpoena with the information comprising the subject matter of the second subpoena.

10. The method of claim 9 wherein the additional information relating to the second subpoena is received from a second computer server associated with a government agency that is different than a government agency associated with the computer server of claim 1.

11. A computer-implemented method for processing an electronic subpoena, the method comprising the steps of:
   receiving into a computing device, electronic information comprising: a subpoena, a legal description of a person to be served the subpoena, a unique subpoena identifier and one or more government agencies associated with the subpoena;
   transmitting from the computing device to a computer server a designation of the computing device associated with the subpoenaed person;
   transmitting from the computing device to the computer server, by affirmative action, an acknowledgement of receipt of the electronic information comprising the subpoena and receipt of a hardcopy of the subpoena, wherein the acknowledgement is also identified with the unique subpoena identifier;
   searching stored computer records on a computer storage operatively attached to the computing device for data relating to the information comprising the subject matter of the subpoena;
   indicating with a processor operatively attached to the computer storage which computer records relate to the information comprising the subject matter of the subpoena; and
   transmitting from the computing device to a designated aggregation device for aggregating the subpoenaed information, data comprising: the stored computer records and related to the information comprising: the subject matter of the subpoena, the unique subpoena identifier and an indication of one or more government agencies which are to receive the transmitted data.

12. The method of claim 11 additionally comprising the steps of:
   monitoring electronic data stored in the computer storage and descriptive of one or more transactions with the processor operatively attached to the computer storage;
   indicating, with the processor operatively attached to the computer storage, which data is related to the one or more transactions and which data also relates to the subject matter of the subpoena; and
   transmitting with the computing device the data which relates to the transaction and also relates to the subject matter of the subpoena, to the designated aggregation device.

13. The method of claim 11 additionally comprising the steps of:
   receiving into the computing device an updated request comprising new information related to the subject matter of the subpoena and the unique subpoena identifier;
   searching the stored computer records in the computer storage operatively attached to the computing device with the processor operatively attached to the computer storage for data relating to the new information related to the subject matter of the subpoena; and
   transmitting with the computing device data relating to the new information related to the subject matter of the subpoena to a designated aggregation device.

14. The method of claim 11 additionally comprising the steps of:
   receiving into the computing device a search algorithm generated by a computer server and related to the request contained within the subpoena; and
   searching the stored computer records on the computer storage operatively attached to the computing device based upon the received search algorithm.

15. The method of claim 14 additionally comprising the steps of:
   receiving into the computing device an executable search software program from a computer server and operative with the search algorithm to search the stored computer records on the computer storage operatively attached to the computing device; and executing the executable search software program with a processor operatively attached to the computer storage to ascertain data related to the subject matter of the subpoena.

16. A computer-implemented method for delivering a subpoena, the method comprising:
   storing digital information comprising a subpoena on a computer server, wherein the stored information comprises a unique subpoena identifier;
   delivering a hardcopy of the subpoena to one or more subpoenaed parties;
   associating the unique subpoena identifier with each hardcopy of the subpoena, wherein the subpoena identifier uniquely identifies the subpoena and the stored information;
   receiving into the computer server a request for the digital information comprising the subpoena and a search algorithm generated by the computer server and based upon subject matter of the subpoena;
   transmitting the digital information comprising the subpoena, the search algorithm and the subpoena identifier from the computer server to one or more designated computing devices, each computing device being associated with a subpoenaed party; and
   receiving digital data into the computer server, said data identified with the unique subpoena identifier and responsive to a request contained within the subpoena and the search algorithm.

17. A method for processing a subpoena, the method comprising:
   a subpoenaed person or their agent receiving a hardcopy of a subpoena including a subpoena identifier;
   receiving electronic information from a computer apparatus connected to a communications network into a computing device connected to the communications network and also associated with the subpoenaed person, the electronic information comprising the subpoena, a search algorithm and the subpoena identifier, wherein the search algorithm and the subpoena identifier have been generated by an electronic subpoena service system;
   generating in the computing device an indication confirming that the subpoena identifier received electronically corresponds with the hardcopy subpoena identifier;
   searching stored computer records stored in an electronic storage connected to the computing device with a processor operatively connected to the computer storage for data relating to a request contained within the subpoena and the search algorithm; and
   transmitting with the computing device data discovered in the search of the stored computer records which relates to the request contained within the subpoena to the computer apparatus via the communication network.

18. A computer-implemented method of interacting with a network access device so as to electronically receive and respond to a subpoena, the method comprising the steps of:
   one or more of the subpoenaed person and their representative receiving a hardcopy of a subpoena and a unique subpoena identifier identifying the subpoena;
   one or more of the subpoenaed person and their representative initiating interaction with a host computer server via the network access device, wherein the network access device is operatively connected to an electronic communications network;
   one or more of the subpoenaed person and their representative inputting information into the network access device via a graphical user interface on the network access device, wherein the information identifies an entity to which a subpoena is to be served and the unique subpoena identifier;
   one or more of the subpoenaed person and their representative transmitting from the network access device the input information to a host computer server storing an electronic version of the subpoena;
   one or more of the subpoenaed person and their representative downloading from the first computer server to the network access device, an electronic version of the subpoena; and
   one or more of the subpoenaed person and their representative acknowledging receipt of the subpoena through an affirmative interaction with a user input device operatively connected to the network access device, wherein the affirmative interaction causes an indication of the receipt of the subpoena to be transmitted to the first computer server.

19. The method of claim 18 additionally comprising the steps of:
   one or more of the subpoenaed person and their representative receiving from the first computer server into the network access device a search argument related to the subpoena; and
   one or more of the subpoenaed person and their representative implementing a search of data on a second computer server based upon the received search argument, wherein the second computer server is in operative communication with the network access device.

20. The method of claim 19 additionally comprising the steps of:
   one or more of the subpoenaed person and their representative receiving from the first computer server into the network access device an executable software program operative with the search argument to search data files stored on the second computer server for information related to the subject matter of the subpoena; and
   creating with the network access device a report comprising data related to the subject matter of the subpoena discovered during a search of the data files stored on the second computer server with the executable software program and the search argument.

* * * * *